United States Patent Office 2,719,868
Patented Oct. 4, 1955

2,719,868
PROCESS FOR THE PRODUCTION OF A CHLORINATION PRODUCT OF DICYCLOPENTADIENE

Wilhelm Konz and Curt Vogelbach, Ingelheim am Rhein, Germany, assignors to "C. H. Boehringer Sohn," Ingelheim am Rhein, Germany, a partnership No Drawing. Application May 22, 1951,
Serial No. 227,748

Claims priority, application Germany May 22, 1950

2 Claims. (Cl. 260—648)

This invention relates to a new stable chlorination product of dicyclopentadiene containing besides two chlorine atoms still a double bond (ethylenic unsaturation) in the molecule. The product according to the invention is therefore a dichloro-dihydro-dicyclopentadiene. This invention relates also to the preparation of the product.

As known, dicyclopentadiene gives extremely unstable halogenadducts when it is halogenated [see H. E. Roscoe, J. Chem. Soc. 47, 669 (1885); G. Kraemer, H. Spilker, Ber. d. deutsch. Chem. Ges. 29, 559 (1896)].

Furthermore it is known that the process according to the British Patent 638,012 furnishes stable chlorination products of dicyclopentadiene containing in the molecule at least four chlorine atoms and are free from double bonds.

It has now been found, that chloro derivatives of 5,6-dihydro-dicyclopentadiene can be obtained if gaseous or liquid chlorine is passed into dicyclopentadiene, which is dissolved in an inert solvent, preferably with cooling, until the reaction product contains 30–40% chlorine. As inert solvents, which come into question for the carrying out of the process according to the invention, there may be mentioned for example carbontetrachloride, chloroform, trichlorethylene, ethylenechloride and the like. After working up of the reaction product a compound is obtained in a good yield which according to its chemical behaviour and the results of analysis was found to be 5,6-dichloro-5,6-dihydrodicyclopentadiene (I):

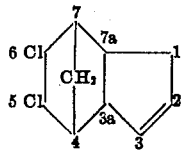

At ordinary temperature this compound is an oil having a density of $D_4^{20}=1.27$ and can be distilled at 12 mm. Hg between 140 and 155° C. without decomposition. The analysis gives the following results (calculated as $C_{10}H_{12}Cl_2$); $C_{10}H_{12}Cl_2$ (Mol. W. 20301):

Calculated_____C, 50.11; H, 5.96; Cl, 34.93
Found_____C, 58.34; H, 5.76; Cl, 35.10

As this compound does not react with phenylazide [K. Alder, G. Stein, Ann. 485, 223 (1931)] the reactive double bond in 5,6-position of the dicyclopentadiene is believed to be saturated with chlorine.

When hydrogenated the dichloro-dihydro-dicyclopentadiene absorbs 1 mol hydrogen and gives a hydrogenation product of the formula $C_{10}H_{14}Cl_2$ (Mol. W. 205.03).
Analysis:
Calculated_____C, 58.53; H, 6.88; Cl, 34.59
Found_____C, 58.46; H, 6.64; Cl, 34.03

Dichloro-dihydro-dicyclopentadiene is a very effective insecticide. Furthermore, it can be used as intermediate in other synthesis. The following working examples illustrate the present invention more closely without limiting it.

Example 1

71 g. chlorine are passed into a solution of 132 g. technical dicyclopentadiene in 318 cc. carbon tetrachloride during 45 minutes with water cooling. After the evaporation of the solvent 195 g. of a reaction mixture are obtained, which is fractionally distilled in vacuo. After an initial fraction which comes over at 44–140° C. under 12 mm. Hg (the reaction mixture is bubbling with formation of hydrogen chloride), 130 g. of a clear liquid is obtained at 140–150° C. under 12 mm. Hg, which has a chlorine content of 35.1% and a specific gravity of $D_4^{20}=1.27$.

Example 2

132 g. of technical dicyclopentadiene are chlorinated as in Example 1 and the reaction mixture is then thoroughly stirred with 100 cc. of a 10% aqueous solution of sodium carbonate. The carbon tetrachloride layer is then separated, washed with water and dried. After distiling off the solvent the residue (192 g.) is distilled in vacuo. After an initial fraction, 135 g. of dichloro-dihydro-dicyclopentadiene are obtained at 144–155° C. under 12 mm. Hg without formation of hydrogen chloride.

What we claim is:
1. Process for the production of a chlorination product of dicyclopentadiene, characterised in that chlorine is passed into a solution of dicyclopentadiene in an inert solvent, preferably with cooling, until the reaction product contains 30–40% chlorine, evaporating said solvent from said product and thereafter fractionally distilling said product at reduced pressure to obtain a fraction boiling at 140°–150° C. under 12 mm. Hg.
2. Process for the production of a chlorination product of dicyclopentadiene, characterised in that chlorine is passed into a solution of dicyclopentadiene in an inert solvent, preferably with cooling, until the reaction product contains 30–40% chlorine, adding an aqueous solution of sodium carbonate to the reaction mixture to form two layers and recovering the solvent layer and thereafter fractionally distilling said product at reduced pressure to obtain a fraction boiling at 140–150° C. under 12 mm. Hg.

References Cited in the file of this patent
UNITED STATES PATENTS

| 2,382,038 | Bruson _____ Aug. 14, 1945 |
| 2,561,209 | Kittleson et al. _____ July 17, 1951 |

FOREIGN PATENTS

| 638,012 | Great Britain _____ May 21, 1950 |